Verner B. Sublett
Guy D. Winstead
INVENTORS

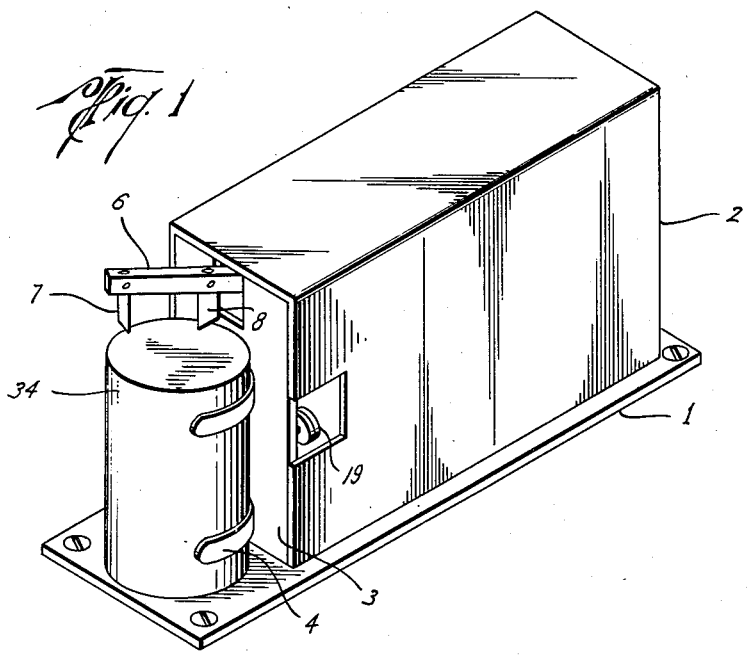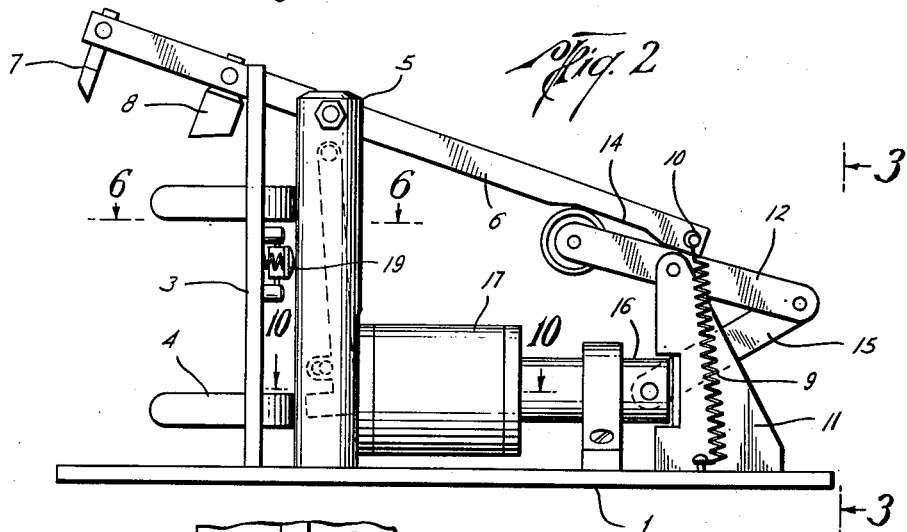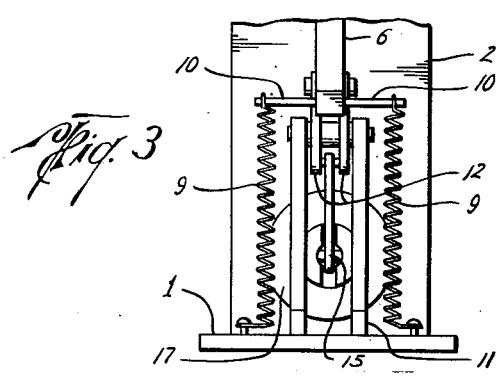

BY Pamela O Wyatt

ATTORNEY

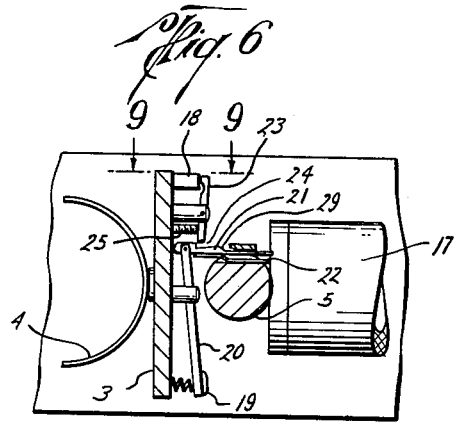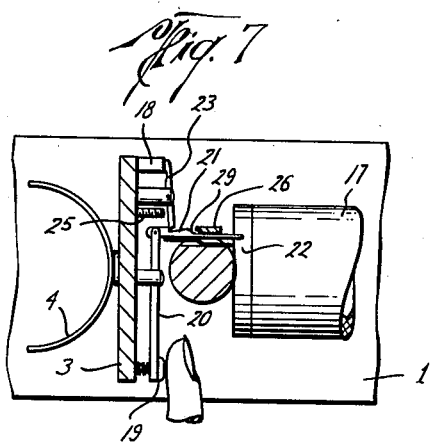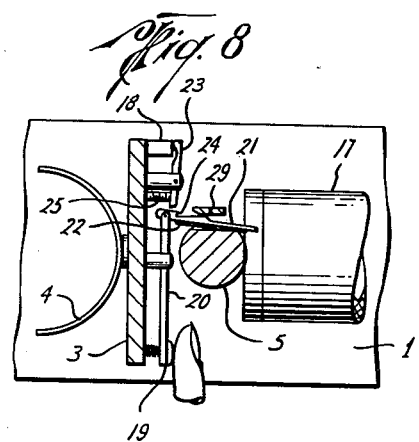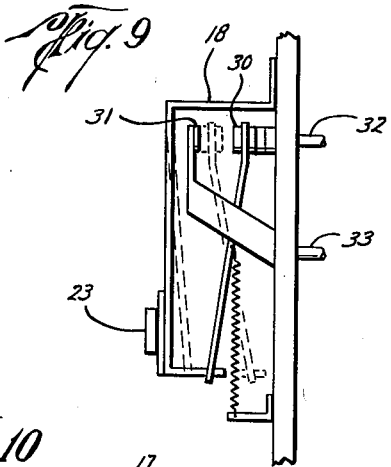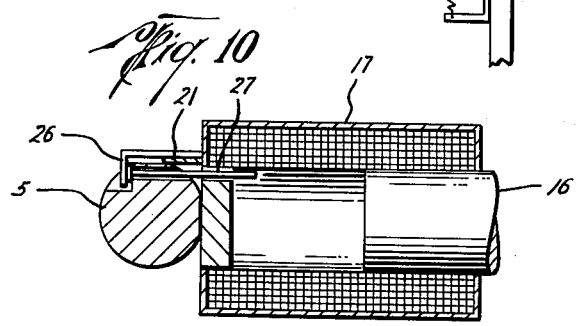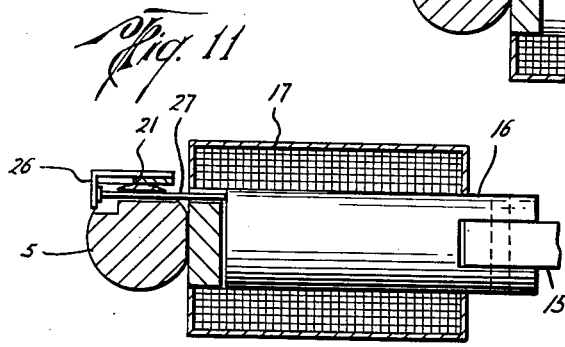

United States Patent Office 2,790,233
Patented Apr. 30, 1957

2,790,233

CAN OPENER

Verner B. Sublett and Guy D. Winstead,
Corpus Christi, Tex.

Application May 21, 1956, Serial No. 586,194

5 Claims. (Cl. 30—4)

This invention relates to new and useful improvements in a can opener.

It is an object of this invention to provide means for opening canned products, such as beer cans, wherein the opening mechanism is electrically operated.

It is another object of this invention to provide a can opener that is electrically operated, having novel means for selectively limiting the operation of the mechanism to a single opening movement.

It is still a further object of the invention to provide a can opening device having novel means for performing a dual perforation.

With the above and other objects in view, the invention has relation to certain novel features of construction, operation and arrangement of parts more particularly defined in the following specifications and illustrated in the accompanying drawings, wherein:

Figure 1 is a perspective view of the device.

Figure 2 is a side elevational view, with the housing removed.

Figure 3 is an end view of the operating mechanism taken on the line 3—3 of Figure 2.

Figure 6 is a fragmentary side elevational view of the switch means employed, taken on the line 6—6 of Figure 2.

Figure 7 is a fragmentary side elevational view showing the switch in closed position.

Figure 8 is a fragmentary side elevational view showing the means for disconnecting the switch.

Figure 9 is a enlarged, fragmentary view of the switch employed.

Figure 10 is a longitudinal side elevational view, in section, taken on the line 10—10 of Figure 2, showing the solenoid disengaging means in inactive position, and Figure 11 is a fragmentary side elevational view, in cross section, taken on the line 11—11 of Figure 5, showing the solenoid disengaging means in another position.

Figure 4:
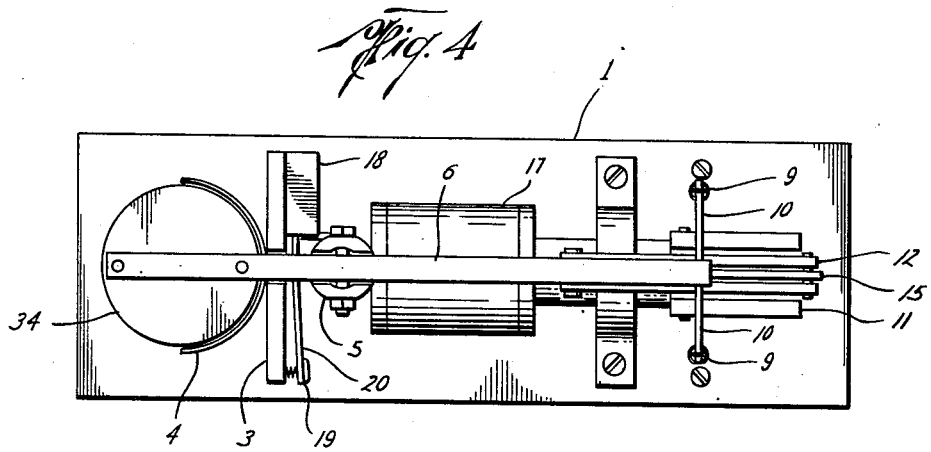
Figure 4 is a top plan view.
Figure 5:
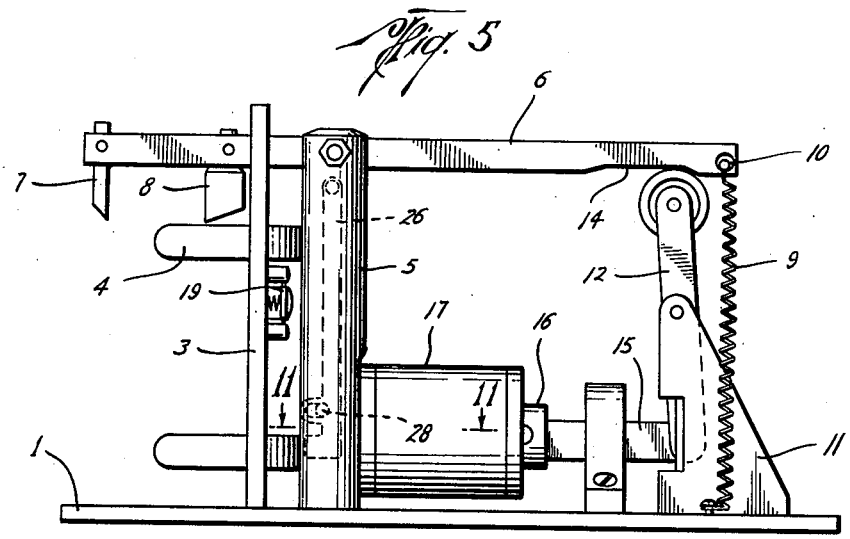
Figure 5 is a side elevational view showing the device in opening position.

Referring now more particularly to the drawings, the numeral 1 designates a rigid base on which the housing 2 is removably mounted. A front panel 3 is mounted on the base 1, and suitable guards 4, 4 may be mounted on the panel 3. An upstanding support 5 is mounted on the base 1 and the operating, or actuating bar, 6 is pivotally mounted on the support 5, and on which the cutters 7 and 8 are mounted at the extended end thereof. The other end of the bar 6 is yieldingly anchored to the base 1 as by means of the springs 9, 9, which extend from suitable means on the bar 6, such as the studs 10, 10, to the base 1.

An upstanding lever support 11, mounted on the base 1, is preferably formed of a pair of rigid members between which is pivotally mounted the lever 12. A suitable contact, such as the roller 13, is mounted on the free end of the lever 12 and abuts against the bar 6, which is preferably indented as at 14 to receive the roller 13. The other end of the lever 12 is preferably pivotally secured to the link 15 which is in turn pivotally connected at its other end to the solenoid arm 16.

A guide, such as the guide 17, is mounted on the base 1, or cast integrally therewith, to maintain the link 15 and arm 16 in alignment with the solenoid 17.

A switch 18, having a means for manual activation, such as the finger control button 19, is mounted on the panel 3 and a switch lever 20, pivotally mounted on the panel 3, and operated by the button 19, has the pivotally mounted control bar 21, which extends through the support 5, through suitable openings therein, and a spring 22 urges the bar 21 against the spring loaded point lever 23, and a notch, as 24, in the bar 21 contacts the end of the lever 23. The lever 23 is preferably spring loaded to constantly urge same into open position by suitable means (not shown) and a stud 25 limits the movement of the lever 23 in one direction. A pivotal bar 26 is mounted on the support 5 and the free end of the bar 26 has a contact rod 27 which extends through the support 5 into the solenoid 17. Suitable stop means, as 28, limits the pivotal movement of the bar 26. The bar 21 has an enlarged portion, forming a shoulder 29, for a purpose to be hereinafter mentioned.

When it is desired to open a can, or to perforate the top thereof, the full can is placed on the base 1, against the guards 4, and the finger of the user depresses the button 19, moving the lever 23 of the switch 18 to cause the points 30, 31 to be brought into contact, completing a circuit of electrical energy through the wires 32, 33, activating the solenoid 17, causing the solenoid arm 16 to move forwardly, operating the link 15 and lever 12 to raise the bar 6 with sufficient force to cause the cutters 7, 8 to be lowered against the top of the can, as 34, effecting the desired perforations therein. As the arm 16 moves forwardly, it will contact the rod 27 and move same outwardly, pivoting the bar 26, and causing the bar 26 to ride up on the shoulder 29, depressing the spring 22, moving the bar 21 away from the lever 23, permitting the shoulder 24 to clear the end of the lever 23, and the lever 23 to move into open position against the stud 25, deactivating the switch 18 until the button 19 is released, permitting the parts to return to their starting position. As soon as the switch 18 is deactivated, the solenoid arm 16 will be drawn back into starting position and the bar 26 will move off of the shoulder 29 and the spring 22 will urge the bar 21 back into position to permit the shoulder 24 to contact the free end of the lever 23.

It is contemplated that the button 19 may be mounted in any suitable manner, such as extending same through the panel 3, to permit depression thereof by pressure of the can against same to operate the device as hereinbefore described.

While the foregoing is considered a preferred form of the invention, it is by way of illustration only, the broad principle of the invention being defined by the appended claims.

What we claim is:

1. In a can opener, a rigid base, an upstanding support on said base, a pivotally mounted arm on said support, one end of said arm having perforating means thereon and the other end of said arm being yieldably anchored to said base, an electrically operated solenoid having a solenoid lever movably mounted therein, connecting means between one end of said arm and said lever, said means being pivotally mounted on said base and bearing against and moving said yieldably anchored end of said arm upwardly when said solenoid is activated moving said perforating means downwardly against a can to be perforated.

2. In a can opener, a rigid base, an upstanding support mounted on said base, an actuating arm pivotally mounted on said support, an electrically operated solenoid on said base, a solenoid arm in said solenoid, pivotally mounted links between said solenoid arm and said actuating arm, cutters mounted on one end of said actuating arm and the other end thereof being yieldably anchored to said base, means for energizing said solenoid to move the solenoid arm forwardly, causing the said links to move said yieldably anchored end of said actuating arm upwardly and said cutters downwardly.

3. In a can opener, a rigid base, an upstanding support mounted on said base, an actuating arm pivotally mounted on said support, an electrically operated solenoid on said base, a solenoid arm in said solenoid, pivotally mounted links between said solenoid arm and said actuating arm, cutters mounted on one end of said actuating arm and the other end thereof being yieldably anchored to said base, means for energizing said solenoid to move the solenoid arm forwardly, causing the said links to move said yieldably anchored end of said actuating arm upwardly and said cutters downwardly, and means actuated by said solenoid arm for deenergizing said solenoid upon the forward movement of said solenoid arm.

4. In a can opener, a rigid base, an upstanding support on said base, an actuating arm pivotally mounted on said support, said arm having cutters on one end and being yieldably anchored to said base at the other end, a solenoid on said base, having a solenoid arm, connecting means between said solenoid arm and said actuating arm, means for energizing said solenoid comprising: a pair of contact points, a switch lever yieldably maintaining said points out of contact, manually operated means for moving said points into contact and energizing said solenoid and means actuated by said solenoid arm for breaking said contact and maintaining said switch lever deactivated until the manual means is released and again manipulated.

5. In a can opener, a rigid base, an upstanding support on said base, an actuating arm pivotally mounted on said support, said arm having cutters on one end and being yieldably anchored to said base at the other end, a solenoid on said base, having a solenoid arm, connecting means between said solenoid arm and said actuating arm, means for energizing said solenoid comprising a pair of contact points, a switch lever yieldably maintaining said points out of contact, manually operated means for moving said points into contact and energizing said solenoid and a bar mounted in said solenoid and positioned to be contacted by said solenoid arm at the end of its stroke and moved outwardly disengaging said contact points and maintaining said points out of contact until said switch lever is released.

References Cited in the file of this patent

UNITED STATES PATENTS

| | | |
|---|---|---|
| 2,692,426 | Newsom et al. | Oct. 26, 1954 |
| 2,703,926 | Ragan | Mar. 15, 1955 |
| 2,712,689 | Chambers | July 12, 1955 |